United States Patent [19]

Elsässer et al.

[11] Patent Number: 4,658,312
[45] Date of Patent: Apr. 14, 1987

[54] DISK STORAGE DRIVE

[75] Inventors: Dieter Elsässer; Bernhard Schuh, both of St. Georgen, Fed. Rep. of Germany

[73] Assignee: Papst-Motoren GmbH & Co. K.G., St. Georgen, Fed. Rep. of Germany

[21] Appl. No.: 767,671

[22] Filed: Aug. 21, 1985

Related U.S. Application Data

[63] Continuation of Ser. No. 412,093, Aug. 27, 1982, abandoned.

[30] Foreign Application Priority Data

Sep. 7, 1981 [DE] Fed. Rep. of Germany ....... 3135385

[51] Int. Cl.$^4$ .............................................. G11B 5/012
[52] U.S. Cl. ....................................... 360/97; 310/156
[58] Field of Search ................................ 360/97–99; 310/156

[56] References Cited

U.S. PATENT DOCUMENTS

| | | | |
|---|---|---|---|
| 3,691,542 | 9/1972 | Gabor | 360/97 |
| 3,706,085 | 12/1972 | Mowrey | 360/97 |
| 3,845,339 | 10/1974 | Merkle | 310/156 |
| 4,031,558 | 6/1977 | Kusaka | 360/108 X |
| 4,150,406 | 4/1979 | Stollorz | 360/97 |
| 4,337,491 | 6/1982 | Hasler | 360/97 |
| 4,438,542 | 3/1984 | Schuh | 360/97 |

Primary Examiner—A. J. Heinz
Attorney, Agent, or Firm—Fitch, Even, Tabin & Flannery

[57] ABSTRACT

Disk storage drive for receiving at least one storage disk provided with a central opening. The disk drive is provided with an outer rotor type driving motor having a rotor casing mounted by means of a shaft in a bearing system so as to rotate relative to a stator and receive the storage disk. The stator includes magnetically active parts. At least that part of the rotor casing receiving the storage disk is made from a non-ferromagnetic material and carries the shaft either directly or by means of a hub. A shield made from a ferromagnetic material is provided as an inner part of the rotor casing. The shield envelopes the circumference and one end of the magnetically active parts of the driving motor. The outer diameter of the rotor casing is smaller than the central opening of the storage disk.

29 Claims, 4 Drawing Figures

FIG. 1
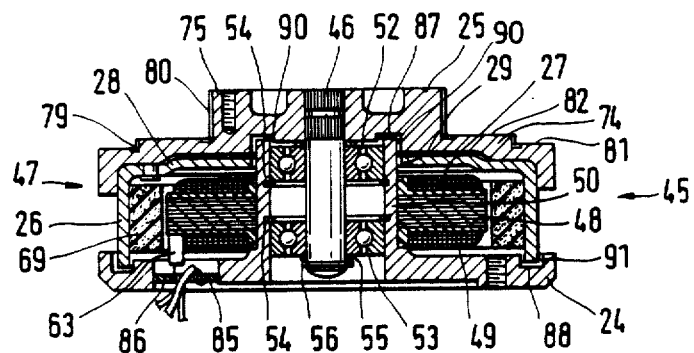
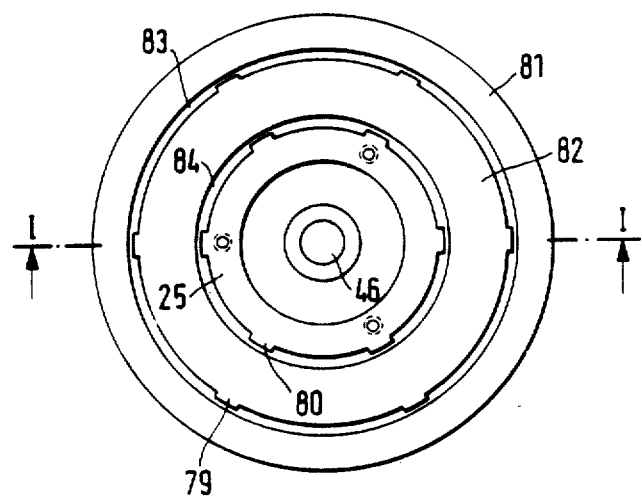
FIG. 2

DISK STORAGE DRIVE

This application is a continuation of application Ser. No. 412,093 filed Aug. 27, 1982 and now abandoned.

BACKGROUND OF THE INVENTION

The invention relates to a disk storage drive for receiving at least one storage disk having a central opening, with an outer rotor type driving motor having a rotor casing mounted by means of a shaft in a bearing system so as to rotate relative to a stator and on which can be placed the storage disk for driving by the rotor casing, as described in U.S. patent application Ser. No. 353,584, now U.S. Pat. No. 4,438,542, issued Mar. 27, 1984.

The content of this patent is incorporated herein by reference to avoid unnecessary repetition. It relates to a disk store and storage drive for receiving at least one storage disk having a central opening. The driving motor extends coaxially at least partly through the central opening of the storage disk, and means are provided for connecting the storage disk and the driving motor rotor.

BRIEF SUMMARY OF THE INVENTION

The problem of the present invention is to further simplify the construction of a disk store described in the aforementioned U.S. Pat. No. 4,438,542, while improving its operation. In particular, the storage disk is to be reliably protected against undesired influencing by the magnetically active parts of the driving motor. In addition, a particularly space-saving and robust construction of the driving motor are to be achieved.

According to the invention, this problem is solved in that at least the part of the rotor casing receiving the storage disk is made from a non-ferromagnetic material and carries the shaft directly or by means of a hub and in that a magnetic shield made from a ferromagnetic material in the form of a drawn can projects into the storage disk receiving part of the rotor casing and is connected thereto. The shielding surrounds the periphery of the magnetically active parts of the driving motor and also envelops the parts at one end. The shield has a central opening whose edge is directly radially adjacent the shaft or parts of the driving motor carrying or supporting the shaft. A rotor casing constructed in this way can be easily manufactured, and it effectively protects the magnetically sensitive storage disks, particularly magnetic hard storage disks, against magnetic stray flux emanating from the magnetically active parts of the driving motor. The shield is preferably in the form of a deep-drawn can, and the part of the rotor casing receiving the storage disk can be made for a lightweight metal by die casting.

If, in the manner described in the aforementioned U.S. Pat. No. 4,438,542, the driving motor is constructed as a brushless direct current motor with a permanent magnet rotor, then in accordance with a further development of the invention a printed circuit board with at least one rotary position detector and perhaps other electronic components for the control and regulation of the driving motor are mounted on the side of the stator remote from the bottom of the shielding can. This ensures that the rotary position detector and any further circuit components of the magnetic shielding arrangement do not interfere with the rotating parts.

Further advantageous developments of the invention also are disclosed. Features of the invention also contribute to a compact construction of the disk storage drive. In connection with disk storage drives of the present type, high demands are made on the concentricity of the storage disks. It is therefore generally necessary to machine the storage disk receiving part or to work it in some other way so that it is dimensionally true. As a result of other features, the necessary machining is reduced to a relatively small part of the circumferential surface of the storage disk receiving part and a trouble-free engagement of a storage disk on the shoulder of the storage disk receiving part is permitted.

Other features of the claimed invention provide a robust precision mounting support; provide for utilizing the available axial overall length for maximizing the distance between the bearings; and permit particularly large distances between the bearings where the axial installation area between a mounting or assembly flange and the end of the storage disk receiving part is limited. Installation space is available on the other side of this flange. Still other features provide for alternative solutions leading to particularly small radial runouts of the rotor; ensure a space-saving housing of the circuit board; and for solutions where importance is attached to a particularly shallow construction.

BRIEF DESCRIPTION OF THE DRAWINGS

The invention is described in greater detail hereinafter relative to non-limitative embodiments and the attached drawings, wherein:

FIG. 1 is a vertical partial sectional view through a a first embodiment of the invention along the line I—I of FIG. 2;

FIG. 2 is a plan view of the arrangement of FIG. 1;

DETAILED DESCRIPTION OF THE PREFERRED EMBODIMENTS

Figure 3:
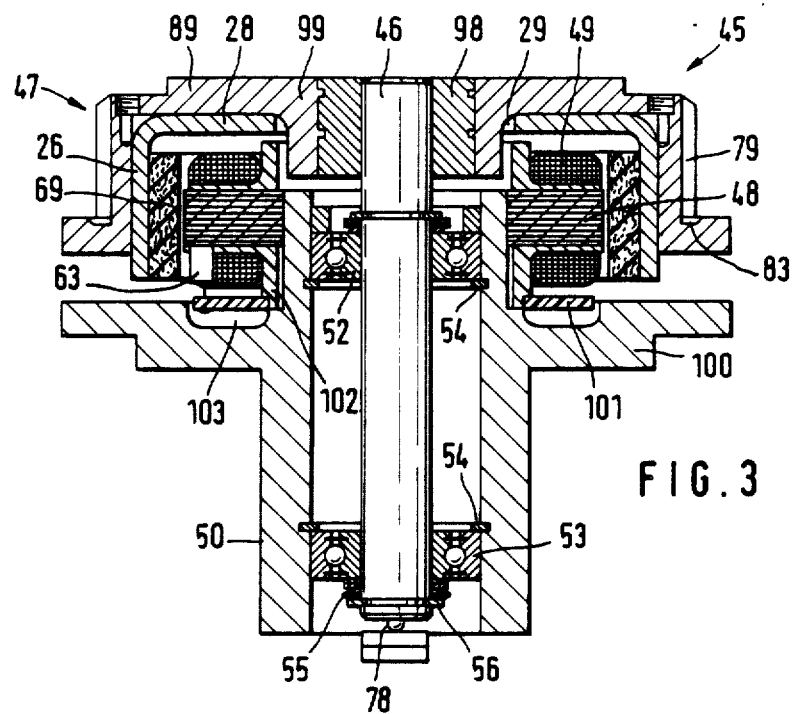
FIG. 3 is a sectional view through another embodiment of the invention with an extended bearing tube.

The disk storage drive illustrated in FIG. 1, having an extremely shallow construction, has a brushless direct current motor 45 having a rotor casing 47 fixed to and coaxial with a rotor shaft 46. A stator lamination 48, carrying a stator winding 49, is mounted on a bearing tube 50. The rotor shaft 46 is rotatably mounted within the bearing tube 50 by means of two bearings 52 and 53. These are kept axially spaced by a pair of retaining rings 54. A cup spring 55 is supported on the underside of the bearing 53 by a retaining ring 56 resting on the rotary shaft 46, so that the bearings 52, 53 are axially braced relative to one another. The bearings 52, 53 are pressed into the bearing tube 50 at the time of assembly. Together with an assembly flange 24, the bearing tube 50 forms a one-piece die casting.

The rotor casing 47 comprises a storage disk receiving part 25 and a shielding can 26, which are joined together, for example, by riveting. The storage disk receiving part 25 is made from a non-ferromagnetic material, preferably lightweight metal. The rotor shaft 46 is pressed into a central opening of the storage disk receiving part 25. As an alternative, the shaft can be cast into the receiving part.

The shielding can 26 is made from a ferromagnetic material and can in particular be constructed as a soft iron deep-drawn part. A plurality of permanent magnetic segments or a one-part permanent magnet 69 are fixed to the inner face of shielding can 26 radially facing the stator lamination 48. The permanent magnet 69 preferably comprises a mixture of hard ferrite, for example, barium ferrite, and an elastic material. Thus, it is a so-called rubber magnet. The latter is trapeziodally or approximately trapezoidally radially magnetized via the pole pitch in a motor construction having a relatively small pole clearance. At the same time, the shielding can 26 forms the magnetic return path for magnet 69. The shielding can 26 surrounds the magnetically active parts 48, 49, 69 of the driving motor 45 on the periphery thereof, as well as on one end thereof. The bottom 28 of shielding can 26 is adapted to the shape of the coil winding heads 27 of the stator winding 49 and contains a central opening 29, whose edge is in the immediate radial vicinity of the circumferential surface of the bearing tube 50. In this way, the shielding can effectively prevents the magnetic flux from straying towards the outside of the storage disk receiving part 25.

The storage disk receiving part 25 has two stepped stages 74 and 75, each of whose circumferential surfaces in the present embodiment carry a plurality of radially distributed and projecting bearing webs 79 or 80. The outsides of bearing webs 79, 80 are ground in a dimensionally true manner to accommodate the internal diameter of the hard storage disks to be placed on the receiving part 25. The stepped stages 74, 75 form shoulders 81, 82 and are provided respectively with an annular recess 83 and 84 at the foot axially of bearing webs 79, 80. This structure ensures that storage disks mounted on the bearings webs 79, 80, and having either one of two opening diameters, will cleanly engage against either the shoulder 81 or 82.

The assembly flange 24 is provided with a recess 85 in which is housed a printed circuit board 86. This printed circuit board carries a rotary position detector, for example a Hall IC, as well as other circuit components for the control and regulation of the driving motor 45. The Hall IC 63 extends up axially from the circuit board 86 to the immediate vicinity of the stator lamination 48. The permanent magnet 69 projects axially over the stator lamination 48 in the direction of circuit board 86 until it partly overlaps the Hall IC 63. In this way, the Hall IC 63 or, if desired, some other magnetic field-dependent semiconductor component, determines the rotary position of the rotor of the driving motor 45.

In the illustrated embodiment, the two bearings 52, 53 are spaced approximately the same axial distance from the axial center of the permanent magnet 69 and the stator lamination 48.

Disk storages are most usually operated in "clean room" environments to protect them against contaminants. By means of the assembly flange 24, the storage drive is arranged on a partition (not shown) which separates the ultra-clean area for receiving the storage disks from the remainder of the interior of the equipment. Dirt particles, grease vapours and the like from bearing 52 and parts of the driving motor 45 are prevented from passing into the storage disk receiving area by labyrinth seals 90 and 91. The labyrinth seal 90 is formed in that the end of the bearing tube 50 away from the assembly flange 24 that projects into an annular slot 87 on the inside of the storage disk receiving part 25, accompanied by the formation of sealing gaps. Similarly, for forming the labyrinth seal 91, the end of the shield can 26 projects into the annular slot 88 of the assembly flange 24. The labyrinth seals 90, 91 are preferably dimensioned in the manner described in the aforementioned U.S. Pat. No. 4,438,542.

The embodiment of FIG. 3 differs from the arrangement according to FIGS. 1 and 2 in that storage disks having the same opening diameters are placed on bearing webs 79 of a storage disk receiving part 89, which surrounds the majority of the axial dimension of the magnetic shielding can 26. In other words, the magnetically active parts 48, 49, 69 of the driving motor 45 are partially located within the central opening of the storage disk. A bush-like hub 98 is pressed or cast into the storage disk receiving part 89. The rotor shaft 46 is then pressed into the hub 98. The edge of the central opening 29 in the bottom 28 of the shielding can 26 extends up to the portion 99 of the receiving part 89 which received the hub 98.

The bearing tube 50 projects in the axial direction on the side of the assembly flange 100 remote from the stator lamination 48. As a result, a particularly large axial spacing between the two bearings 52, 53 can be achieved. Axially, bearing 52 is in the vicinity of the axial center of the permanent magnet 69 and of the stator lamination 48. The axial spacing between bearings 52 and 53 is equal to or larger than double the bearing external diameter. To prevent electrical charging of the rotor which in operation rotates at high speed and which would disturb the operational reliability of the disk storage device, the rotor shaft 46 is electrically conductively connected to the equipment chassis by means of a bearing ball 78 and a spring contact (not shown). The printed circuit board 101, carrying the rotary position detector 63 and the other electronic components, is supported on the end of a spacer ring 102 facing an assembly flange 100 and is located between the flange and the stator lamination 48. An annular slot 103 is formed in assembly flange 100 and is aligned with the annular circuit board 101. The annular slot 103 provides space for receiving the wire ends and soldered connections projecting from the underside of the circuit board 101.

Figure 4:
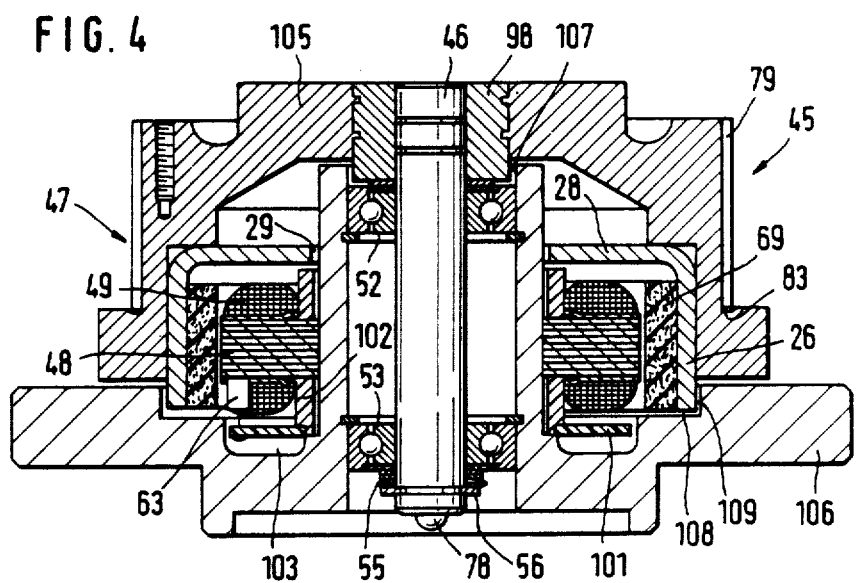
FIG. 4 is a sectional view through a further embodiment of the invention.

FIG. 4 shows an embodiment in which a storage disk receiving part 105 is axially extended in order to be able to house a larger number of storage disks than in the arrangement of FIG. 3. The bearing tube 50 is correspondingly axially extended in order to be able to use the existing installation space with a view to a maximum axial spacing between the bearings 52 and 53. The end of the bearing tube 50, remote from as assembly flange 106, embraces the hub 98 connecting the receiving part 105 and the shaft 46, accompanied by the formation of a labyrinth seal 107. The edge of the central opening 29 of shielding can 26 extends up close to the outside of the bearing tube 50. The free end of the shielding can 26 engages a recess 108 in the assembly flange 106. As a result, a further labyrinth seal 109 is formed. This embodiment otherwise corresponds to the structures described hereinbefore. It should be apparent that certain constructional features are interchangeable in all the illustrated embodiments.

While the invention has been described in connection with a preferred embodiment and certain alternatives, other alternatives, modifications, and variations may be apparent to those skilled in the art in view of the foregoing description. Accordingly, it is intended to embrace all such alternatives, modifications, and variations as fall within the spirit and scope of the appended claims.

What is claimed is:

1. A disk storage drive for receiving at least one storage disk having a central opening, said drive including an outer rotor type motor, comprising
   a rotor casing having a shaft mounted therein extending axially internally thereof;
   a bearing system receiving said shaft and rotatingly mounting said rotor casing;
   a stator including magnetically active parts of said motor, said rotor casing being mounted to rotate around the periphery of said stator,
   said rotor casing having a storage disk receiving part, said storage disk receiving part having a substantially cylindrical circumferential outer surface portion coaxial to said shaft and formed to coaxially extend through said central opening of said storage disk to receive and drive said disk, said storage disk receiving part being made of a non-ferromagnetic material;
   a separate distinct magnetic shield mounted internally of said rotor casing and having a substantially cylindrical wall portion generally peripherally surrounding the magnetically active parts of the motor and being radially enclosed for at least part of the axial extension thereof by said circumferential surface portion of said storage disk receiving part, the diameter of said substantially cylindrical circumferential portion of said disk receiving part being larger than the diameter of said substantially cylindrical wall portion of said magnetic shield and smaller than the diameter of the central opening in said magnetic disk, said magnetic shield being made of a ferromagnetic material.

2. A disk drive according to claim 1, further comprising a plurality of circumferentially distributed, radially projecting bearing webs on the outer circumferential surface of the rotor casing disk receiving portion for receiving the storage disk through its central opening, the outer surfaces of the bearing webs being in a dimensionally true form for receiving said disk.

3. A disk drive according to claim 2, wherein the storage disk receiving part has a radially outwardly projecting shoulder near one axial end of the bearing webs and which is provided with an annular recess at the foot axially of said webs.

4. A disk drive according to claim 1 wherein said driving motor is a brushless direct current motor with a permanent magnetic rotor, wherein the substantially cylindrical wall portion of the magnetic shield has a generally closed end, and further comprising a printed circuit board with a least one rotary position detector mounted thereon, the board being disposed on the side of the stator opposite the generally closed end of the magnetic shield.

5. A disk drive according to claim 4, wherein said rotary position detector includes a magnetic field-dependent semiconductor component extending axially from the circuit board to the vicinity of an iron core of the stator and wherein said permanent magnet rotor projects axially over the iron core in the direction of the circuit board to at least a partial axial overlap with said rotary position detector.

6. A disk drive according to claim 4, further comprising a bearing tube coaxially mounting and bearing system and said stator wherein said bearing tube is connected to a radially directed mounting flange located on the side of the stator iron core axially opposite the generally closed end of the shield, whereby support is provided for said bearing tube carrying the stator and the bearing system.

7. A disk drive according to claim 6, wherein said bearing tube passes through a central clearance opening in the generally closed end of the shield.

8. A disk drive according to claim 6 or 7, wherein said bearing tube is axially extended and extends the axial length of said mounting flange and remote from the stator.

9. A disk drive according to claim 8, wherein said bearing system comprises two axially spaced bearings and one of the bearings is axially positioned near the axial center of the rotor magnet and the stator.

10. A disk drive according to claim 9, wherein the axial spacing of the two bearings is at least equal to twice the bearing external diameter.

11. A disk drive according to claim 6 or 7, wherein said bearing system includes two bearings disposed with approximately equal axial spacing in either direction from the axial center of the rotor magnet and the stator.

12. A disk drive according to claim 6, wherein the circuit board is located within the direct axial vicinity of a recess in the mounting flange, said recess at least partially encircling the bearing tube.

13. A disk drive according to claims 6, wherein the circuit board is supported on the end of a spacer ring near the mounting flange and is located between the flange and the stator.

14. A disk drive according to claim 1, wherein the substantially cylindrical wall portion of the magnetic shield has a generally closed end, wherein the stator includes coil winding heads and wherein the shield is conformed adjacent its closed end to the shape of the coil winding heads.

15. A disk drive according to claim 1 wherein said storage disk receiving part further includes a substantially radially extending end wall portion closing the rotor casing at one of two axial ends thereof and carrying said shaft.

16. A disk drive according to claim 1 or 15 wherein said magnetic shield further includes a substantially radially extending end wall portion positioned adjacent the inner side of the substantially radially extending end wall portion of said storage disk receiving part and having a central opening through which said shaft extends.

17. A disk drive according to claim 1 or 15 wherein said substantially cylindrical circumferential outer surface is one full continuous cylinder.

18. A disk drive according to claim 1 wherein said ferromagnetic material is soft iron.

19. A disk storage drive for receiving at least one storage disk having a central opening, said drive including an outer rotor type motor comprising:
   a generally cylindrical rotor casing closed at one of its ends and having a shaft coaxially mounted therein;
   a bearing system receiving said shaft and rotatingly mounting said rotor casing;
   a bearing tube coaxially mounting said bearing system;
   a stator supported on the outside of said bearing tube, said stator including magnetically active parts of said motor, said rotor casing being mounted to rotate around the periphery of said stator;
   said rotor casing having a storage disk receiving part with an outer peripheral surface;

a magnetic shield mounted internally of the rotor casing radially intermediate the outer peripheral surface of said storage disk receiving part and the magnetically active motor parts;

said storage disk receiving part being formed to coaxially extend through said central opening of said storage disk for receiving and driving the disk, said receiving part being made of a non-ferromagnetic material;

said magnetic shield being made of a ferromagnetic material and having a cylindrical body portion generally peripherally surrounding, and at one of its ends enclosing, the magnetically active parts of the motor, and being peripherally encircled by said storage disk receiving part, the outer peripheral surface of said storage disk receiving part radially surrounding both the magnetic shield and the magnetically active parts of the motor being sufficiently smaller than the central opening of the storage disk to receive the disk thereon, whereby the drive motor extends coaxially through the central opening of the storage disk, the magnetically active parts of the motor being partially located within the central opening of the storage disk.

20. A disk drive according to claim 19 wherein said driving motor is a brushless direct current motor with a permanent magnetic rotor, and further comprising a printed circuit board with at least one rotary position detector mounted thereon, the board being disposed on the side of the stator opposite the generally closed end of the magnetic shield.

21. A disk drive according to claim 20, wherein said stator is connected to a radially directed mounting flange located onth side of the stator iron core axially opposite the generally closed end of the shield, whereby support is provided for said bearing tube carrying the stator and the bearing system.

22. A disk drive according to claim 21, wherein the bearing tube and the radially directed mounting flange are formed of one piece.

23. A disk drive according to claim 21, wherein said bearing tube passes through a central clearance opening in the generally closed end of the shield.

24. A disk drive according to claim 21, 22 or 23, wherein said bearing system includes two bearings disposed with approximately equal axial spacing in either direction from the axial center of the rotor magnet and the stator.

25. A disk drive according to claim 21, wherein the circuit board is located within the direct axial vicinity of a recess in the mounting flange, said recess at least partially encircling the bearing tube.

26. A disk drive according to claim 21, wherein the circuit board is supported on the end of a spacer ring near the mounting flange and is located between the flange and the stator.

27. A disk drive according to claim 20, wherein said rotary position detector includes a magnetic field-dependent semiconductor component extending axially from the circuit board to the vicinity of an iron core of the stator and wherein said permanent magnet rotor projects axially over the iron core in the direction of the circuit board to at least a partial axial overlap with said rotary position detector.

28. A disk drive according to claim 19, further comprising a plurality of circumferentially distributed, radially projecting bearing webs on the circumferential surface of the rotor casing disk receiving portion for receiving the storage disk through its central opening, the outer surfaces of the bearing webs being in a dimensionally true form for receiving said disk.

29. A disk drive according to claim 28, wherein the storage disk receiving part has a radially outwardly projecting shoulder near one axial end of the bearing webs and which is provided with an annular recess at the foot axially of said webs.

* * * * *

Disclaimer 4,658,312—Dieter Elsasser; Bernhard Schuh, both of St. Georgen, Fed. Rep. of Germany. DISK STORAGE DRIVE. Patent dated April 14, 1987. Disclaimer filed by the assignee, Papst-Motoren GmbH & Co. K.G.

Hereby enters this disclaimer to the remaining term of said patent.

*(Official Gazette, August 13, 2002)*